United States Patent [19]

Urza

[11] Patent Number: 4,830,841

[45] Date of Patent: May 16, 1989

[54] CONVERSION OF URANIUM HEXAFLUORIDE TO URANIUM DIOXIDE

[75] Inventor: Inaky J. Urza, Richland, Wash.

[73] Assignee: Advanced Nuclear Fuels Corporation, Richland, Wash.

[21] Appl. No.: 819,836

[22] Filed: Jan. 17, 1986

Related U.S. Application Data

[63] Continuation-in-part of Ser. No. 685,306, Dec. 24, 1984, abandoned.

[51] Int. Cl.⁴ .......................................... C01G 43/025
[52] U.S. Cl. .................... 423/261; 423/258; 423/260; 423/19; 252/643; 264/0.5
[58] Field of Search ................. 423/260, 19, 253, 261; 264/0.5; 252/643

[56] References Cited

U.S. PATENT DOCUMENTS

| | | | |
|---|---|---|---|
| 3,160,471 | 12/1964 | Knudsen et al. | 423/261 |
| 3,168,369 | 2/1965 | Reese et al. | 423/261 X |
| 3,235,327 | 2/1966 | Blundell et al. | 423/261 |
| 3,765,844 | 10/1973 | Rode | 423/253 X |
| 3,845,193 | 10/1974 | Littlechild | 423/261 |
| 3,978,194 | 8/1976 | Knudsen et al. | 423/261 |
| 4,112,055 | 9/1978 | Artaud | 423/261 |
| 4,397,824 | 8/1983 | Butler et al. | 423/260 |

Primary Examiner—John F. Terapane
Assistant Examiner—Virginia B. Caress
Attorney, Agent, or Firm—Volker R. Ulbrich; Joseph J. Dvorak

[57] ABSTRACT

The present invention contemplates the conversion of uranium hexafluoride with superheated steam to produce a fine, submicron, uranyl fluoride powder which is agglomerated and densified in a fluidized bed of a uranium oxide material. Thereafter, the agglomerated and densified uranyl fluoride is defluorinated and reduced in the fluidized bed to yield a fluoride containing uranium oxide material having a uranium to oxygen ratio of from about 1:2.0 to about 1:2.67. The so-produced fluoride contains uranium oxide material treated with steam and hydrogen to produce ceramic grade uranium dioxide.

11 Claims, 1 Drawing Sheet

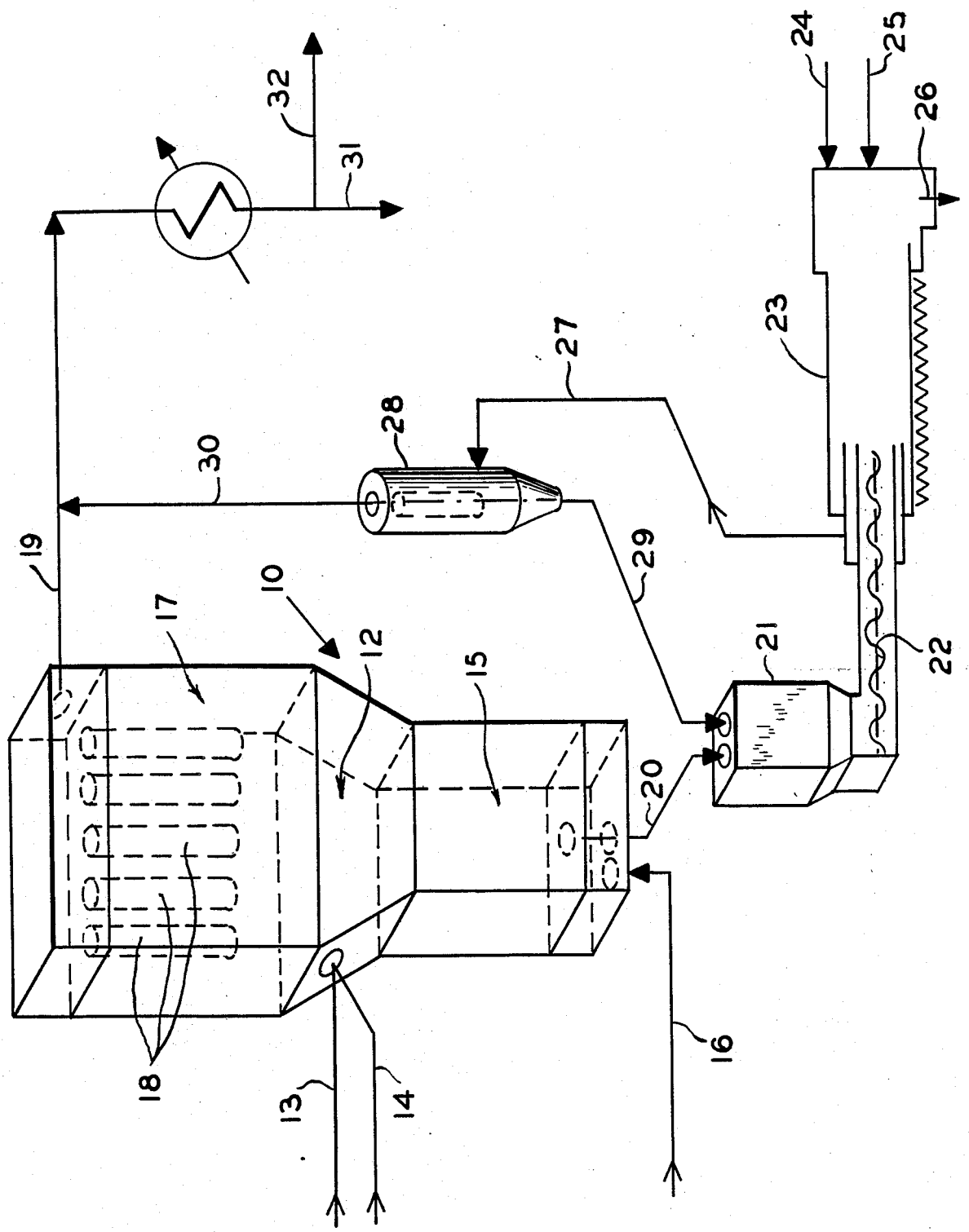

CONVERSION OF URANIUM HEXAFLUORIDE TO URANIUM DIOXIDE

CROSS-REFERENCE TO RELATED APPLICATIONS

This application is a continuation-in-part of U.S. Pat. application Ser. No. 685,306, filed Dec. 4, 1984, now abandoned.

FIELD OF THE INVENTION

This invention relates to the dry processing of uranium hexafluoride to ceramically active uranium dioxide. More particularly, this invention pertains to the conversion of uranium hexafluoride with steam to form uranyl fluoride which is subsequently defluorinated and reduced to uranium dioxide.

BACKGROUND OF THE INVENTION

The reaction of uranium hexafluoride ($UF_6$) with steam to produce uranyl fluoride ($UO_2F_2$) is well known. The defluorination/reduction of uranyl fluoride with steam and hydrogen to produce uranium dioxide of low fluoride content also is well known. Various types of reactors and rotary kilns have been employed in sequentially carrying out the so-called dry conversion of uranium hexafluoride to uranyl fluoride and the subsequent defluorination and reduction of uranyl fluoride to uranium dioxide ($UO_2$).

Representative of processes for the conversion of uranium hexafluoride to uranium dioxide in furnaces and rotary kilns and the like are the following: U.S. Pat. No. 3,168,369; U.S. Pat. No. 3,260,575; U.S. Pat. No. 3,235,327; U.S. Pat. No. 3,845,193; U.S. Pat. No. 4,112,055 and U.S. Pat. No. 4,397,824.

Representative examples of processes in which the conversion is carried out in one or more fluid beds can be found in U.S. Pat. No. 3,547,598; U.S. Pat. No. 3,765,844; U.S. Pat. No. 3,978,194; U.S. Pat. No. 4,020,146; U.S. Pat. No. 4,053,559 to mention a few.

The deficiencies of the foregoing processes are well known. For example, in some instances the throughput rate is limited by the defluorination rate of $UO_2F_2$. In other instances, the $UO_2F_2$ powder obtained is very fine, has poor flow characteristics, is ceramically inactive and requires milling, high pressing pressures and a binder for pelletizing. In yet other processes, the use of multiple complex reactors increases the difficulty to control the process as well as increases the cost associated with producing the desired uranium dioxide. Indeed, the very number of processes disclosed is testimony to the continuing need for a new and an improved process for the conversion of uranium hexafluoride to uranium dioxide.

SUMMARY OF THE INVENTION

Briefly stated, the present invention contemplates the conversion of uranium hexafluoride with superheated steam in a vapor phase reaction to produce a submicron uranyl fluoride ($UO_2F_2$) powder. The $UO_2F_2$ is agglomerated, defluorinated and reduced in a fluidized bed consisting essentially of a uranium oxide having a uranium to oxygen ratio of from about 1:2 to about 1:2.67 to yield a fluoride-containing material consisting essentially of a uranium oxide material having substantially the same composition as the uranium oxide material of the fluid bed. The so-produced fluoride containing material is treated with steam and hydrogen in a rotary kiln to produce ceramic grade uranium dioxide.

It has been found that if submicron uranyl fluoride powder of low bulk density and high surface area is agglomerated and densified in a fluidized bed consisting essentially of uranium oxides having a uranium to oxygen ratio of from about 1:2.0 to about 1:2.67, the primary particle identity of the uranyl fluoride powder is retained, providing an agglomerate of high porosity. Indeed, the porous nature of the uranyl fluoride agglomerate is carried over into the final uranium dioxide product and a ceramically active, reproducibly sinterable, uranium dioxide product is obtained which can be pelletized without a binder.

BRIEF DESCRIPTION OF THE DRAWING

For a better understanding of the invention, reference is made to the accompanying drawing which is a schematic view, partly in vertical cross-section, illustrating a suitable arrangement of reactors used for practicing the subject invention in one continuous process.

DETAILED DESCRIPTION OF THE INVENTION

As shown in the FIGURE, reactor 10 comprises a first reaction zone 12 into which uranium hexafluoride and steam are injected through a concentric nozzle (not shown) via lines 13 and 14, respectively. Reactor 10 also comprises a fluidized bed reaction zone 15 for the defluorination and reduction of uranyl fluoride particles by contact with steam and hydrogen introduced via line 16. The reaction zone 15 is provided with a bed of fluidizable particles of uranium dioxide or a uranium oxide material, such as that from a previous run, having a uranium to oxygen ratio of from about 1:2.0 to about 1:2.67. Reactor 10 also is equipped with a filter zone 17 at the top of the reactor 10. As shown, filter zone 17 is provided with a plurality of blow-back type filters 18 for removing the submicron uranyl fluoride particles entrained in the process off-gases which are removed via line 19. The filters, of course, are equipped with means (not shown) to blow them back with a pulse of compressed nitrogen to remove accumulated solids. Since the filters are located above the fluidized bed the solids so-removed fall directly into the fluidized bed.

Line 20 is provided for the removal of a fluoride-containing uranium oxide having a uranium to oxygen ratio of about 1:2.0 to about 1:2.67. The uranium oxide material is collected in a feed bin 21 and thereafter conveyed by conveyor means 22 to rotary kiln 23. The fluoride containing uranium oxide material is contacted in the rotary kiln with hydrogen and steam introduced via lines 24 and 25, respectively, to produce the uranium dioxide product. The uranium dioxide product is removed via line 26.

The off-gas from the rotary kiln is sent via line 27 to a filter chamber 28 having for example a porous initial filter therein where entrained solids are separated from the off-gas and returned via line 29 to the feed bin 21. The off gases from the filter chamber are sent via line 30 to line 19 where they are combined and preferably passed through a condenser 33 for removal of hydrogen fluoride vapor. this by-product, hydrofluoric acid, is removed via line 31 with the balance of the off gases being taken off via line 32.

In the process of the present invention, uranium hexafluoride is hydrolyzed in reaction zone 12 of reactor 10 by feeding the uranium hexafluoride and a mixture of preheated steam and nitrogen through a concentric nozzle via lines 13 and 14 so as to produce gaseous and solid reaction products. This hydrolysis of uranium hexafluoride to uranyl fluoride, as shown in equation 1, proceeds to completion with excess steam, $$UF_6 + 2H_2O \rightarrow UO_2F_2 + 4HF \qquad \text{Eq. 1}$$

almost instantaneously even at low temperatures; and, it may be carried out over a very wide temperature range, although experience has shown that there is a tendency for the deposition of uranyl fluoride on the vessel walls near the nozzle when the hydrolysis reaction takes place below about 300° C. Consequently, it is particularly preferred in the practice of the present invention, that the reaction be carried out at temperatures above about 300° C. and preferably in the range of about 350° C. to 500° C. Also, in the practice of the present invention, the amount of steam employed to hydrolyze the uranyl fluoride is in excess of the stoichiometric amount required to hydrolyze the uranium hexafluoride, for example, from about 4.0 to 7.0 moles of steam per mole of uranium. Optionally, the superheated steam is diluted with nitrogen in amounts ranging generally from about 0.5 to 1.5 moles of nitrogen per mole of uranium.

As will be readily appreciated, the vapor phase reaction of dry steam with uranium hexafluoride forms extremely fine, light, uranyl fluoride powder. Indeed, the uranyl fluoride powder is submicron in size, i.e., less than 1.0 microns and generally between 0.05 to 0.2 microns in size. The physical characteristics of a typical uranyl fluoride powder produced under these conditions are given in Table I below.

TABLE I

| Physical Properties of Uranyl Fluoride Powder | |
| --- | --- |
| Surface area, m²/g | 20–30 |
| Bulk density, g/cm³ | 0.05–0.1 |
| Particle size, microns | <0.2 |

At the time that the uranium hexafluoride is introduced into reaction zone 12 of reactor 10, along with the superheated steam and optional nitrogen, if any, the reactor 10 is provided with an initial bed of a uranium oxide material such as uranium dioxide or a mixture of $UO_2$ and $U_3O_8$, or the like, which is fluidized in zone 15 by a mixture of preheated steam, nitrogen and hydrogen. In any event, as shown in Equations 2 and 3, the uranyl fluoride introduced into reaction zone 12 is defluorinated and reduced.

$$UO_2F_2 + H_2 \rightarrow UO_2 + 2HF \qquad \text{Eq. 2}$$

$$3UO_2F_2 + 3H_2O \rightarrow U_3O_8 + 6HF + \tfrac{1}{2}O_2 \qquad \text{Eq. 3}$$

The rate of defluorination and reduction of uranyl fluoride, of course, depends upon the gas composition, the fluidizing gas velocity, the residencew time and temperature. Generally, the defluorinaiton/reduction of uranyl fluoride in fluidized bed 15 is conducted at temperatures in the range of about 580° C. to about 700° C. Also, the amount of steam and hydrogen employed is in excess of the stoichiometric amount required to convert uranyl fluoride to a uranium oxide material, having a uranium to oxygen ratio of about 1:2.0 to about 1:2.67. Finally, it should be noted that in the practice of the present invention, it is particularly desirable to carry out the defluorination and reduction or uranyl fluoride in the fluidized bed 15 to a fluoride content in the range of about 0.1 to 1.2 weight percent and preferably in the range of about 0.5 to 1.0 weight percent. This generally requires average residence times of material in the bed ranging from about 2.5 hours. Throughout the process, the fluoride containing uranium dioxide is continuously withdrawn via line 20 to bin 21 at a rate sufficient to maintain a substantially constant bed level.

Returning to the hydrolysis of uranium hexafluoride to uranyl fluoride in reaction zone 12, as would be expected, the gases from the vapor phase reaction of the $UF_6$ and steam combine with the fluidizing gases that have passed through the fluidized bed of uranium oxide material with the result that a substantial amount of the uranyl fluoride is entrained in the fluidizing and reaction gases and is carried to the blow-back filters 18 overhead. The blow-back filters 18 are pressurized, from time to time, with a pulse of nitrogen resulting in the dislodging of the uranyl fluoride solids collected on the filters. Thus, the uranyl fluoride from the filters and the uranyl fluoride not entrained drop into the fluidized bed where it is transformed to larger agglomerates in the upper portion of the bed and where it subsequently is densified and agglomerated while it is being defluorinated and reduced. This agglomerization, defluorination and reduction process allows the uranyl fluoride fines to be processed in a fluid bed. Also, as will be readily appreciated, the bed level is maintained constant by removal of fluoride containing uranium dioxide via line 20, as previously mentioned.

After the uranyl fluoride is defluorinated and reduced to a predetermined fluoride content (e.g., 0.1 to 1.2 wt.% fluoride), the fluoride containing uranium oxide material is removed via line 20 to bin 21 where it is subsequently fed by a conveyor means to a rotary kiln for further reduction and defluorination. In general, the temperature in the rotary kiln is maintained in the range of about 580° C. to 800° C. while the uranium oxide feed material is contacted through a countercurrent flow of excess steam and hydrogen. The amount of steam and hydrogen is generally sufficient to reduce the fluoride content of the product to below 100 parts per million and preferably below 70 parts per million, for example, in the range of 70 to 10 parts per million.

There are a number of significant advantages to the practice of the present invention, some of which are listed below. First, the vapor phase hydrolysis of $UF_6$ produces a fine submicron, light $UO_2F_2$ powder that retains primary particle identity throughout the conversion process thereby resulting in a ceramically active powder. Second, the agglomeration and defluorination/reduction of $UO_2F_2$ in a fluidized bed improves process throughput without compromising the ceramic quality. Third, as should be readily appreciated, the undesirable formation of uranium tetrafluoride is minimized by avoiding the contact of the uranium oxide containing material with a high concentration of hydrogen fluoride vapor. In this process, solids flow in the reactor vessel from the top to the bottom where the product is discharged. The highest concentration of HF is above the $UF_6$ reaction nozzle where $UO_2F_2$ is present. Consequently, the concentration of HF in the fluidized bed is relatively low, particularly because the HF formed from defluorination of the uranyl fluoride is swept away with the fluidizing gas.

In any event, the product from the process of the present invention is consistently uniform, has good ceramic activity, it pelletizes without a binder and sinters to the required specifications without the use of sintering aids. Indeed, the product of the present invention sinters reproducibly to a theoretical density of from about 94 to 96 percent with pore size volume distributions favorable for good irradiation performance in a reactor. Typically pore sizes of 10 microns or less account for 80% of the total volume porosity.

To further illustrate this invention, specific examples are given below.

EXAMPLE 1

In this example, a fluidized bed reactor with an interior diameter of four inches was used. Uranium oxide material approximating $UO_2$ was charged into the fluidized bed section of the reactor to establish the initial bed of fluidized solids. The fluidized bed section and the reaction zone of the vessel were maintained at 650° C. and 500° C., respectively, with external electrical heaters. A preheated mixture of nitrogen, hydrogen and steam was used to fluidize the bed. Uranium hexafluoride was fed into the reaction zone with preheated steam and nitrogen at a uranium hexafluoride feed rate of 8.7 kg/hr. The mole ratio of gases to uranium in each section of the reactor is summarized in Table II below.

TABLE II

| Reaction Zone | Gas | Gas/U Mole Ratio |
| --- | --- | --- |
| Nozzle | $H_2O$ (steam) | 4.3 |
|  | $N_2$ | 2.0 |
| Fluid Bed | $H_2$ | 1.6 |
|  | $H_2O$ (steam) | 1.8 |
|  | $N_2$ | 1.8 |

The uranyl fluoride formed was collected on a sintered metal filter located above the reaction zone and blown back, from time to time, into the fluidized bed.

Product from the reactor was routinely withdrawn to maintain a constant bed level. The product was granular, free flowing and had a bulk density of 2.5 g/cc. The composition of the fluoride containing uranium oxide product was 87.1 weight percent uranium and 0.24 weight percent fluoride. After the flow of $UF_6$ was terminated, the bed material was retained in the fluidized bed for 30 minutes for further defluorination and reduction. The fluoride level of the retained uranium oxide bed material was reduced to 50 ppm.

Since the product was relatively low in fluoride, it was used to test pelletizing and sintering characteristics of the powder. Normally, product from the fluid bed reactor is passed through a rotary kiln for the final defluorination/reduction step. To reduce sintered density, the uranium oxide powder was blended with about 20% by weight $U_3O_8$. Then it was hammer milled and pressed into pellet form. The pellets were sintered at 1780° C. for 2.3 hours. The final sintered density ranged from 95.0 to 95.4 percent of the theoretical density. The mean sintered pellet grain size was about 15 microns.

EXAMPLE 2

In this example, a prototypical fluidized bed reactor, such as reactor 10, was used to continuously convert $UF_6$ to a low fluoride containing uranium oxide material approximating $UO_2$. Gaseous $UF_6$ was contacted with superheated steam in reaction zone 12. The $UF_6$ flow rate was 51.0 kg/hr and the steam flow rate was 10.4 kg/hr. The submicron $UO_2F_2$ that formed was separated from the off-gas by a sintered metal filter located above the reaction zone. From time to time, the collected $UO_2F_2$ was blown back from the filter into the top of the fluidized bed. The initial fluidized bed was a uranium oxide material retained in the bed from a previous operation of the reactor. The fluidizing gas to the fluidized bed was composed of 44.8% steam (7.7 kg/hr), 24.6% hydrogen (3.3 scfm) and 30.6% nitrogen (4.1 scfm). The reactor product was withdrawn from the fluidized bed at a rate equivalent to the $UF_6$ feed rate to maintain a constant bed level. Typical product from this system has a fluoride content of 1.0 weight percent.

EXAMPLE 3

In this example, product from the fluidized bed reactor of Example 2 was defluorinated/reduced with hydrogen and steam in a rotary kiln. The calciner temperature profile was controlled at 600° C./750° C. (front to back). The fluoride content of the uranium oxide feed material was reduced to 14 ppm. The physical characteristics of typical $UO_2$ powder produced under these conditions are given in Table III below.

TABLE III

| Physical Properties of $UO_2$ Powder | |
| --- | --- |
| Particle Size (μm) (Medium - Coulter Counter) | 1.8 |
| Bulk Density (g/cm$^3$) | 1.9 |
| Specific Surface area (m$^2$/g) | 3.0 |

The $UO_2$ powder was blended with about 15 wt.% of $U_3O_8$, milled, precompacted, granulated and pressed. The pellets were sintered at 1780° C. for 2.3 hours. The average sintered pellet density was 94.2% of theoretical density with a standard deviation 0.16%.

It should be readily appreciated that many modifications and variations of the invention as described herein may be made without departing from the spirit and scope thereof and only such limitations should be applied as set forth in the claims below.

What is claimed is:

1. A process for the preparation of uranium dioxide, comprising:
   reacting, in the vapor phase, uranium hexafluoride with steam to produce submicron uranyl fluoride powder;
   simultaneously fluidizing a bed of a uranium oxide material having a uranium to oxygen ratio of from about 1:2.0 to about 1:2.67 with a mixture of steam, hydrogen and an inert gas at temperatures in the range of about 580° C. to about 700° C.;
   introducing the submicron uranyl fluoride powder produced from the reaction of uranium hexafluoride and steam at the top of the fluidized bed of uranium oxide material, whereby said submicron uranyl fluoride powder is agglomerated, densified, fluidized, defluorinated and reduced to a fluoride-containing uranium oxide material having a uranium-to-oxygen ratio of from about 1:2.0 to about 1:2.67 and containing minor amounts of fluoride;
   removing the fluoride-containing material from said fluidized bed at a rate sufficient to maintain the level of said fluidized bed substantially constant; and
   contacting said removed material with hydrogen and steam at temperatures in the range of about 600° C., whereby uranium dioxide essentially free of fluoride is obtained.

2. The process of claim 1 wherein said uranium hexafluoride is reacted with steam in excess of the stoichiometric amount required to convert the uranium hexafluoride to uranyl fluoride.

3. The process of claim 2 wherein said uranium hexafluoride is reacted with said steam in a single bed reactor and above said fluidized bed.

4. The process of claim 3 wherein said uranium hexafluoride is reacted with said steam at temperatures in excess of 300° C.

5. The process of claim 4 wherein said uranium hexafluoride is reacted with said steam to produce uranyl fluoride particles of less than 1.0 micron.

6. The process of claim 4 wherein said reaction is conducted at temperatures in the range of about 350° C. to 500° C.

7. The process of claim 5 wherein said uranyl fluoride particles are conveyed to the top of said fluidized bed and said fluoride-containing uranium oxide material is removed at a rate sufficient to provide an average residence time in the bed of from between 2.5 to 4 hours.

8. The process of claim 5 wherein said fluoride-containing material is removed from said bed when said fluoride content is in the range of from about 0.1 to 1.0 weight percent.

9. A process for converting uranium hexafluoride to a ceramically active uranium dioxide comprising:
 (1) establishing a fluidized bed of uranium oxide particles, said particles having a uranium to oxygen ratio of from about 1:2.0 to about 1:2.67;
 (2) reacting uranium hexafluoride with excess steam at temperatures in excess of 300° C. over said fluidized bed of uranium oxide particles, whereby submicron uranyl fluoride powder is formed, a portion of which powder falls into the top of said fluidized bed and a substantial amount of which is entrained in the excess steam;
 (3) removing said entrained uranyl fluoride from said excess steam;
 (4) conveying said removed uranyl fluoride to the top of said fluidized bed;
 (5) defluorinating and reducing said uranyl fluoride in said bed by contact with hydrogen and steam at temperatures in the range of 580° C. to about 700° C. for a time sufficient to produce a uranium oxide material having a uranium to oxygen ratio of from about 1:2.0 to about 1:2.67 and containing minor amounts of fluoride;
 (6) removing said fluoride-containing material at a rate sufficient to maintain the bed level substantially constant; and
 (7) contacting said removed material in a rotary kiln with hydrogen and steam at temperatures in the range of about 600° C. to about 800° C., whereby a ceramically active uranium dioxide essentially free of fluoride is obtained.

10. The process of claim 9 wherein steps 1 to 6 are carried out continuously.

11. The process of claim 10 wherein step 7 also is carried out continuously.

* * * * *